United States Patent [19]

Székely et al.

[11] Patent Number: 4,492,494
[45] Date of Patent: Jan. 8, 1985

[54] PROCESS FOR STABILIZING AQUEOUS SOLUTIONS USED IN THE PREPARATION OF HYDROPHILIC POLYMERIC GELS

[75] Inventors: Tamás Székely; Ferenc Csanda; Gábor Nagy; Győző Czerny, all of Budapest, Hungary

[73] Assignees: Magyar Tudományos Akadémia Természettudományi Kutató Laboratórium; Földmérő és Talajvizsgáló Vállalat, both of Budapest, Hungary

[21] Appl. No.: 290,315

[22] Filed: Aug. 5, 1981

Related U.S. Application Data

[63] Continuation of Ser. No. 957,804, Nov. 6, 1978, abandoned.

[30] Foreign Application Priority Data

Nov. 8, 1977 [HU] Hungary .................. MA 2924

[51] Int. Cl.³ ............................................. E02D 3/12
[52] U.S. Cl. ............................... 405/264; 405/263; 524/808; 523/132
[58] Field of Search ............... 405/263, 264; 166/295; 524/808, 812, 816, 823, 832, 833; 523/130, 131, 132

[56] References Cited

U.S. PATENT DOCUMENTS

| | | | |
|---|---|---|---|
| 2,473,548 | 6/1949 | Smith | 524/832 X |
| 2,764,570 | 9/1956 | Kowolik et al. | 524/816 X |
| 2,801,983 | 8/1957 | Dixon et al. | 405/264 |
| 2,801,984 | 8/1957 | Morgan et al. | 405/264 |
| 3,336,979 | 8/1967 | Ingraham et al. | 166/295 X |
| 3,933,204 | 1/1976 | Knapp | 166/295 |
| 4,094,150 | 6/1978 | Clarke | 523/132 |
| 4,304,805 | 12/1981 | Packo et al. | 405/264 X |
| 4,315,703 | 2/1982 | Gasper | 405/264 |
| 4,330,451 | 5/1982 | Straub et al. | 524/808 X |

OTHER PUBLICATIONS

Leonard, Vinyl and Dien Monomers, Part 1, vol. XXIV, Wiley-Interscience, N.Y., 1970, pp. 168, 181 & 190.
Schildknecht, Polymer Process, Interscience Publs., N.Y. (1956), pp. 28–30.
Kluchesky et al., Industrial & Engineering Chemistry, vol. 41, Aug. 1949, pp. 1768–1771.

*Primary Examiner*—Dennis L. Taylor
*Attorney, Agent, or Firm*—Gabriel P. Katona

[57] ABSTRACT

The invention relates to a process for stabilizing an aqueous gel-forming system comprising one or more water-soluble acrylic monomer as gellifying agent, methylenebis-acrylamide co-monomer and/or one or more mono- or bivalent aldehyde as cross-linking agent, a redox catalyst system containing an alkali metal and/or ammonium persulfate as oxidizing component along with one or more amine compound as reducing component, furthermore optionally one or more water-soluble polymer for adjusting the viscosity of the solution and/or modifying the gel structure. According to the invention said gel-forming system is stabilized by saturating it with molecular oxygen.

The invention relates further to a process for improving the strength and impermeability of particulate materials and/or solid articles. According to the invention an aqueous gel-forming system, stabilized as discussed above, is applied into or onto the article to be treated or into the surroundings thereof, and oxygen saturation of the gel-forming system is suspended at an appropriate time.

7 Claims, 6 Drawing Figures

PROCESS FOR STABILIZING AQUEOUS SOLUTIONS USED IN THE PREPARATION OF HYDROPHILIC POLYMERIC GELS

CROSS-REFERENCE TO RELATED APPLICATION

This application is a continuation of U.S. Ser. No. 957,804, filed Nov. 6, 1978, which application is now abandoned.

This invention relates to a novel process for stabilizing aqueous solutions used in the preparation of hydrophilic polymeric gels. The invention relates further to a process for improving the strength and impermeability of particulate materials and/or solid articles, primarily damaged canals and engineering structures, with said aqueous solutions stabilized according to the invention.

As known, aqueous systems containing water-soluble gel-forming acrylic monomers, methylene-bis-acrylamide comonomer and/or mono- or bivalent aldehydes as cross linking agents, and optionally also containing one or more water soluble polymers for adjusting the viscosity of the solution and/or modifying the gel structure, can be converted, under the effect of redox catalyst systems, into polymeric gels suitable for incorporating particulate materials and/or for coating solid articles. These systems form a solid gel and thereby increase the strength and water impermeability of the substances treated (Hungarian patent specification No. 158,538; U.S. Pat. Nos. 2,801,983, 2,801,984 and 2,856,380). According to the cited references, redox catalyst systems containing an alkali metal or ammonium persulfate as oxidizing component along with a copper(I), iron(II) or tin(II) compound (Hungarian patent specification No. 158,538 and U.S. Pat. No. 2,856,380), diethylenetriamine, tetraethylenepentamine, triethanolamine, dimethylaminoacetonitrile, an alkali metal thiosulfate (U.S. Pat. Nos. 2,801,983 and 2,801,984), dimethylaminopropionitrile, an alkali metal sulfite (Hungarian patent specification No. 158,538, U.S. Pat. Nos. 2,801,983 and 2,801,984), or azo-bis-isobutyronitrile (Hungarian patent specification No. 158,538) as reducing component may be used. Upon the effect of the known catalyst systems, a stable and solid gel is formed instantaneously (within 1 minute or less, as described in the examples of the cited Hungarian patent specification) from the aqueous solutions with the above compositions.

It is also known that most of the underground canal systems made of pre-fabricated pipes do not possess the required impermeability characteristics, owing in part to the inappropriate quality of the pipelines and in part to defects in the impermeability of pipe connections, or because of damages in the canal upon the effect of ageing, traffic, etc. Owing to faults in the building technology, sometimes even canals built on the site prove to be inappropriate. Canals with internally accessible cuts, built in earlier years from bricks or stones inserted into lime mortar, also cause several problems. For example, under the prevailing unfavourable conditions, lime mortar breaks down relatively quickly; cavities are formed behind the canal walling upon the effect of exfiltrating or infiltrating water, whereupon the canal sinks or breaks in.

The impermeability defects of canals frequently cause serious hygienic problems, and result in substantial extra expenses, pipeline breaks, damages in paving, soil flows, damages in buildings, overloading in sewage treatment and pumping plants, etc. Moreover, the sewage escaping from such damaged canals contaminates soil and subsoil water, thus causing serious environmental pollution problems.

Damaged or defective engineering structures, tanks, basins, tunnels, etc., made of pre-fabricated articles or built on the site, cause similar problems.

The high polymerization rate of known compositions forming hydrophilic polymeric gels is disadvantageous when applied to increase strength and impermeability of particulate materials (such as soil, cement, etc.) or solid articles (such as engineering structures, canal networks, rock blankets, etc.). In such instances, because of the high rate of polymerization, the reagent solution should be prepared instantly and should be contacted immediately with the article to be treated, and the formation of gel in the treating device must be carefully avoided, otherwise the device would become plugged and useless. Since plugging of treating devices cannot be avoided with the required security in the normal treatment processes, it is necessary to slow down gel formation, i.e. to stabilize the reagent solution.

In Hungarian patent specification No. 158,538, use of iron(III) salts, particularly potassium ferricyanide, has been suggested for slowing down gel formation. The data disclosed in Example 4 of the cited reference show, however, that gel formation takes place within a relatively short time even in the presence of this retarder, which ensures only that a solid gel does not form immediately when the components are admixed with each other. Aqueous gel-forming systems which retain their liquid state for an arbitrary period under storing but are able to form gel very quickly when contacted with the article to be treated cannot be prepared by using potassium ferricyanide.

The present invention aims at eliminating the above disadvantages by preparing aqueous solutions, usable in the preparation of hydrophilic polymeric gels, which retain their liquid state under storing for arbitrary periods of time. Furthermore, the invention aims at providing a process which enables the stabilized gel-forming aqueous solutions to form a stable and solid gel contacted with the articles to be treated, within a time and in a manner controlled accurately in accordance with the actual requirements.

It has been found that when a redox catalyst system containing a known alkali metal or ammonium persulfate as oxidizing component along with an amine compound as reducing component is added to an aqueous solution of known composition, containing a water-soluble acrylic monomer as gel forming component, methylene-bis-acrylamide co-monomer and/or a mono- or bivalent aldehyde as cross linking agent, and optionally containing a water-soluble polymer for adjusting the viscosity of the solution and/or modifying the gel structure, the liquid state of the resulting gel forming system can be maintained for any arbitrary period if it is saturated with molecular oxygen.

The preferred amine compounds, applicable as reducing components according to the invention, are as follows: trialkylamines, trialkylenediamines, dialkylenetriamines, tetraalkylenepentamines, trialkanolamines, dialkylaminoacetonitriles, dialkylaminopropionitriles, N,N-dialkylalkanolamines, tetraalkyl-butanediamines, tetraalkyl-guanidines, N-alkylmorpholines, N,N-dialkylpiperazines, N,N-dialkylcyclohexylamines, N,N-dialkylbenzylamines, N,N-dialkylphenethylamines, dialkylaminopyridines and bis(2-dialkylaminoethyl)ethers. The "alkyl" and "alkanol" groups of the above compounds may contain 1 to 3 carbon atoms.

Particularly preferred reducing components are the following amino compounds: triethylamine, triethylenediamine, N,N-dimethylethanolamine, N-methylmorpholine, N,N-dimethylbenzylamine, N,N-dimethylphenethylamine and dimethylaminopyridine. Of these latter compounds triethylenediamine proved to be the most preferred.

The saturation of the gel forming system with oxygen can be ensured by continuously introducing gaseous oxygen or an oxygen-containing gas mixture (preferably air) into the liquid. According to our experiences these systems retain their liquid state until saturated with oxygen and then quickly gellify to form a stable and solid gel, when saturation is ceased.

Accordingly, the invention relates to a process for stabilizing an aqueous gel-forming system comprising one or more water-soluble acrylic monomer as gellifying agent, methylene-bis-acrylamide co-monomer and/or one or more mono- or bivalent aldehyde as cross-linking agent, a redox catalyst system containing an alkali metal or ammonium persulfate as oxidizing component along with one or more amine compound as reducing component, and optionally containing one or more water-soluble polymer for adjusting the viscosity of the solution or modifying the gel structure. The system is stabilized according to the invention by saturating it with molecular oxygen.

The aqueous gel-forming system contains the redox catalyst system (consisting of an alkali metal or ammonium persulfate as oxidizing component and an amine compound as reducing component) generally in an amount of 0.1 to 10%, preferably in an amount of 0.5 to 5%. The relative amounts of the oxidizing and reducing components may correspond to the known, usual ratios.

As water-soluble gel forming acrylic monomers, compounds generally used in the preparation of such gels can be applied. Of these compounds the following ones proved to be preferable: acrylamide, methacrylamide and N-methylol and N-oxo derivatives thereof, acrylic acid, methacrylic acid and water-soluble salts thereof, and mixtures of the above acrylic monomers.

As cross-linking agents, methylenebis-acrylamide co-monomer and/or one or more mono- or bivalent aldehyde, such as formaldehyde, acetaldehyde, glutaric aldehyde can be applied. The aqueous gel-forming system contains the acrylic monomer and the cross-linking agent generally in an amount of 5 to 50% by weight, preferably in an amount of 10 to 30% by weight.

If desired, one or more water-soluble polymer can also be added to the aqueous gel-forming system in order to adjust the viscosity of the solution or to modify the structure of the resulting gel. These water-soluble polymers are known substances generally applied for similar purposes. Of the water-soluble polymers it is preferred to apply polyacrylamide, hydrolyzed polyacrylamides, polyacrylic acids or salts of polyacrylic acids, which, through chain transfer reactions, are built into the macromolecules formed from the gel-forming monomers. In this way the gel structure, as well as the mechanical and swelling properties of the resulting gel can be controlled efficiently. Depending on the required viscosity and gel properties, the aqueous gel-forming system may contain 0 to 5% of one or more water-soluble polymer.

The stabilized aqueous gel-forming systems prepared according to the invention retain their liquid state until the saturation of the solution with oxygen is provided for. In order to avoid the occurrence of local gel formation, oxygen should be distributed uniformly in the solution. When gaseous oxygen or an oxygen-containing gas mixture (such as air) is introduced continuously into the solution, the uniform distribution of oxygen can be ensured easily by an appropriate design and location of the gas inlet tube, and by controlling the size and amount of gas bubbles. If necessary, however, the system may be stirred.

According to another feature, the invention relates to a process for improving the strength and impermeability of particulate materials or solid articles by applying the aqueous solutions stabilized as discussed above. According to the invention, an aqueous gel-forming solution stabilized as discussed above is transferred into or onto the article to be treated (such as soil, engineering structures/e.g. canals or liquid storage tanks/, solids for producing water-tight layers, rock layers, etc.) or into the surrounding thereof, and at a suitable time the oxygen-saturation of the solution is suspended. The solution gellifies within a short period after suspending oxygen saturation, and forms a stable, solid gel with excellent impermeability characteristics.

The term "suspending oxygen saturation" refers to operations either with or without external intervention. Oxygen saturation is suspended by external intervention e.g. when the introduction of oxygen gas or an oxygen-containing gas mixture is stopped. Oxygen saturation can also be suspended, however, without external intervention e.g. by allowing the oxygen concentration to decrease spontaneously on the treated area in order to effect gel formation.

The process of the invention can be applied to great advantage in repairing engineering structures, such as canals, tanks for storing liquids, tunnels or other construction elements, optionally insulated from the environment, by the so-called filling-up technology. In this case one proceeds preferably as follows: The structure to be repaired (such as the canal) or a part thereof is filled up with an aqueous gel-forming solution, stabilized by introducing oxygen gas or an oxygen-containing gas mixture, the solution is permitted to infiltrate into the damaged parts and is optionally filled up again, thereafter the excess of the solution is removed while maintaining the introduction of gas, and finally the introduction of gas is stopped.

Figure 1:
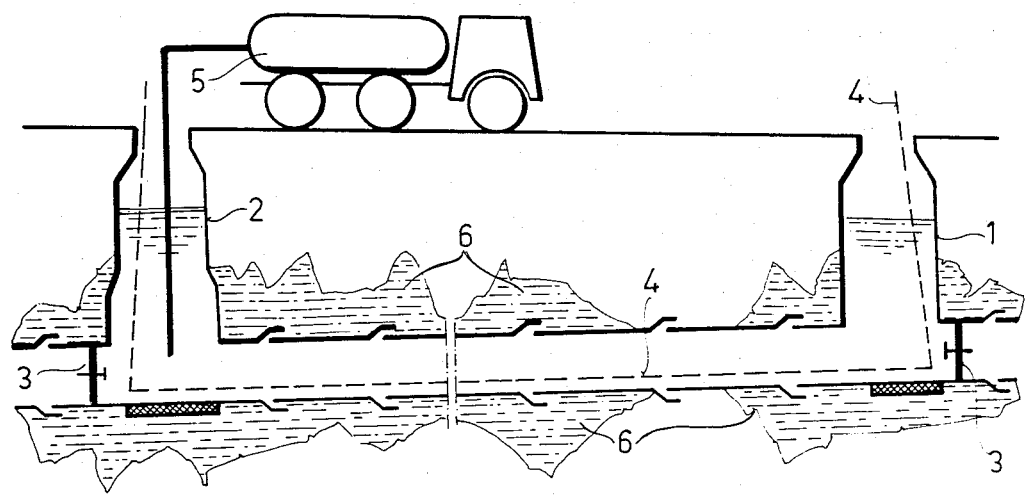
FIG. 1 is a sectional view of a canal to be treated in accordance with the invention.

If necessary, a particular solid material (such as sand) can also be introduced, preferably as a suspension, into the canal or part of canal to be repaired. The solid can be introduced before, simultaneously with or after the introduction of the stabilized gel-forming solution. It is particularly preferable to apply such particulate solid materials in the repair of canals with extensive damaged parts or discontinuities, since in such instances very large amounts of gel-forming solution would be required to ensure complete impermeability. Particulate solid materials assist in plugging the damaged parts or discontinuities, and, by incorporating into the structure of the gel formed from the reagent solution, ensure perfect impermeability.

When long canals are to be repaired, it is preferred to separate a section of the canal to be repaired by space isolating elements, and to fill up only the isolated canal section with the stabilized gel-forming solution. When canals with large cross-sections are to be repaired, it is preferred to insert a space-reducing element into the canal, the position of which can be fixed with spacing elements. In this way the use of excessive amounts of gel-forming solution can be avoided. As space-reducing elements e.g. those described in the Hungarian patent specification No. 153,975, most preferably inflatable plastic hoses, can be used. One can also fill appropriate amounts of a weight-increasing substance (e.g. water) into the hollow bodies applied as space-reducing elements (such as plastic hoses). The advantage of this technique is that the space-reducing element floats in the gel-forming solution introduced, and does not block certain surface parts of the canal from the penetration of the liquid.

The invention is elucidated in detail by the aid of the following Examples.

EXAMPLE 1

Gel-forming solution is prepared from 7 g of water, 3 g of acrylamide, 0.03 g of methylenebis-acrylamide, 0.1 g of triethylenediamine and 0.1 g of ammonium persulfate. When, after weighing the ingredients and mixing them by quick stirring, this solution is filled into a glass and allowed to stand, a solid gel forms within 16 minutes. When the same solution is poured into a gas washing bottle and air is bubbled through it, the solution remains in liquid state for an arbitrary period. When the introduction of air is stopped after 1 hour, the solution gellifies within 16 to 18 minutes. When the introduction of air is stopped after 8 hours, gellifying takes place only in about 100 minutes, due to the decomposition of ammonium persulfate. If, however, additional amounts of ammonium persulfate are introduced into the mixture, either continuously or when the introduction of air is stopped, to adjust the concentration of ammonium persulfate to the initial value, gel formation occurs again within 16 to 18 minutes. When air is bubbled through the solution for 24 hours or more, no gel formation can be observed after stopping the air flow, owing to the complete decomposition of ammonium persulfate. If, however, the concentration of ammonium persulfate is maintained continuously at the initial value, or adjusted to the initial value after stopping the air flow, gel formation occurs again within 16 to 18 minutes. In all of the cases a solid, stable gel is obtained.

The following Examples serve to illustrate the process for improving strength and impermeability of particulate materials solid articles, in connection with canal repair. The process was termed by us as the "Superaqua" process.

EXAMPLE 2

The canal section to be treated is shown in FIG. 1. The canal section bordered by shafts 1 and 2 is cleaned appropriately and then blocked at the shafts with tube stoppers 3. Perforated tube 4 (preferably a flexible corrugated PVC tube), connected to an air compressor on the surface, is inserted into the closed canal section, and the compressor is put into operation.

Thereafter the closed canal section is filled up with the reagent solution through shaft 2. The reagent solution is stored in tank 5. The pressure required to inject the solution into the leakages, cracks, cavities and ducts is ensured by filling up the shaft to the appropriate height. Depending on the defects of the canal, through which the reagent solution exfiltrates, the solution in the shaft is refilled, if necessary. After an appropriate period, preferably when exfiltration ceases (generally after 2 hours), the liquid is removed from the canal section through shaft 2, the introduction of air is stopped, and the tube stoppers are removed. Thus repair is finished.

If the results are to be checked by water-tightness tests using water on air, this can be done before removing the tube stoppers.

The solution exfiltrated through the defects, inappropriate joints, cracks or seepage lines, or penetrated into the seepage lines, cracks, empty interstices, etc., gellifies due to the lack of oxygen supply, and forms impermeable layer 6. This enables not only the seepage lines of the canal to be blocked perfectly, but also the soil surrounding the canal to solidify and become water-tight. Consequently, the embedding conditions of the pipeline also improve to a great extent, which is a decisive factor in view of the stability and life span of canal networks.

For transporting, filling in and pumping back the aqueous reagent solution, it is preferred to apply sludge sniffing lorries equipped with a perforated air inlet tube, a pump and a compressor. The solution in the transport tank should be permanently purged with air.

The aqueous reagent solution is stored preferably in tanks with glass fibre-reinforced polyester walls, equipped at the bottom with perforated air inlet tubes.

The composition of the reagent solution to be applied may vary depending on the local requirements, the material of the canal, the extent of damages, etc. A generally applicable reagent solution may have e.g. the following composition:

tap water: 700 liters
acrylamide: 300 kg
methylenebis-acrylamide: 1.5 kg
N,N-dimethylphenethylamine: 10 kg
ammonium persulfate: 10 kg When preparing the aqueous reagent solution the components are admixed with each other in the above sequence under intense stirring and air bubbling. The solution can also be stirred with the air introduced. The next component can be introduced only when the previously introduced component has already been dissolved completely in water or in the aqueous solution. Solutions prepared in this way can be stored for any desired period when permanent bubbling of air is provided for.

If the solution is to be stored for a prolonged period and one does not intend to bubble air continuously until the next use, one proceeds as follows:

Air is introduced continuously until the complete spontaneous decomposition of the persulfate present. This occurs generally within 12 to 24 hours. Thereafter the solution, which lost its activity, can be stored for any desired period without air bubbling. If the above-indicated amount of ammonium persulfate is introduced again into the solution, the mixture becomes active again, and can be used in repair work as discussed above.

If bubbling of air stops unexpectedly, due e.g. to a technical failure, 1 liter of concentrated copper(II) chloride solution is introduced for every m³ of the solution into the reagent mixture. It is recommended to keep copper chloride solution on stock for such purposes.

EXAMPLE 3

Figure 2:
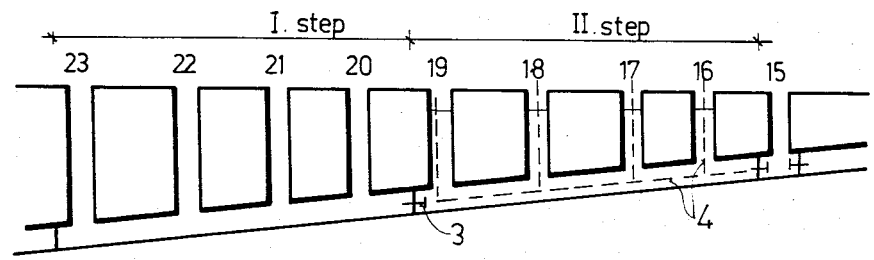
FIG. 2 is an examplary illustration of a canal to be treated.

The canal to be treated is shown in FIG. 2. This example illustrates the repair of a concrete canal, 40 cm in internal diameter, using large-scale techniques. In the first step a section a 120 m long canal section, situated between five shafts (shafts 15 to 19), is treated. In this case 28 m³ of reagent solution are required for filling up and injecting. After repairing the first 120 m section, the reagent solution is passed directly into the second section, also 120 m in length, situated between shafts 19 to 23. This method enables a canal section of 240 m to be repaired within a shift of 8 hours. Such a productivity could not be attained by the reparation methods known so far. In the exemplified case the speed of reparation is 30 m/hour, corresponding to a labour requirement of 0.33 hours/m. Such efficiency cannot be ensured by the known methods of reparation.

When additional lines, such as service connections, are also to be repaired together with the main line, the air inlet tube should also be inserted into the service connections, and these canal sections should also be purged with air during reparation.

EXAMPLE 4

Figure 3:
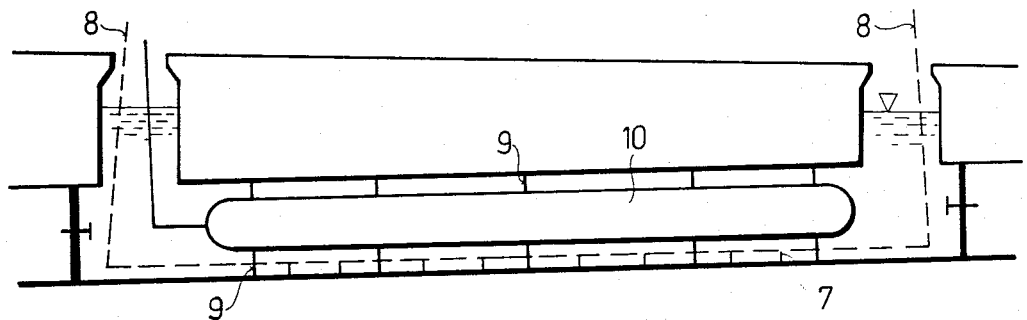
FIG. 3 is a schematic representation of the repair method of this invention.

This example serves to illustrate the repair of engineering structures, such as internally accessible canals, tanks, basins, tunnels, etc., for which the complete filling is difficult or not economical. The method of repair is illustrated in FIG. 3.

The section to be repaired is blocked, perforated air inlet tubes 8 are placed along the tube wall and fixed to each other and to the tube by spacing elements 7, and then space-reducing element 10 (a compact or hollow body) is inserted into the section to be repaired. The space-reducing element can be fixed in the required position by spacing elements 9. As space-reducing element e.g. an inflatable plastic hose blown up with air and optionally filled in part with water, a compact or hollow plastic ball, etc. can be applied. The composition, preparation, storage and transport of the reagent solution, furthermore the method of filling-up and repair are the same as discussed in Example 2.

EXAMPLE 5

Figure 4:
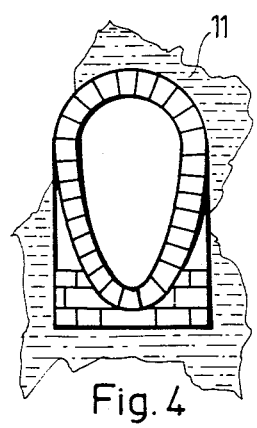
FIG. 4 is a cross sectional representation of a repaired section.

The process of the invention can also be applied with excellent results to repair age-worn brick canals with defects in the brick walls and binders (such as egg-shaped canals with internal dimensions of 60/90 or 80/120 cm). These canals are repaired as discussed in Example 2, but space-reducing elements are inserted into the sections. Upon the treatment, gel fills up the wall joints and cracks. The solution entering the surroundings through the defects (missing bricks, defective joints, etc.) penetrates into the soil, saturating the latter with solution or gel to a thickness of 20 to 70 cm. A sectional view of the repaired canal, along with the surrounding soil layer, is shown in FIG. 4. As can be seen in the figure, a solid, slightly elastic shell 11 of significant volume is formed around the canal. This shell is completely water-impermeable and also ensures an appropriate mechanical strength.

Figure 5:
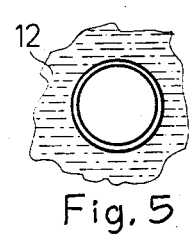
FIG. 5 is a cross sectional representation of another repaired section.

FIG. 5 shows the water-tight shell 12 formed outside the canal wall upon repairing damaged canals with circular cross-sections.

EXAMPLE 6

Figure 6:
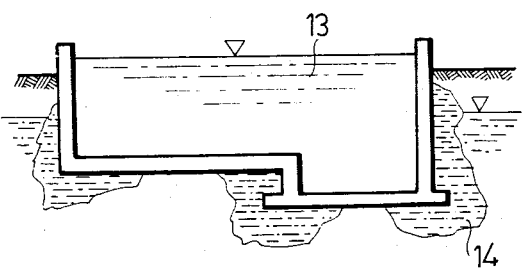
FIG. 6 is a cross sectional representation of the repair of an open basin in ground water.

FIG. 6 shows the repair of an open basin inserted into soil water.

The basin is cleaned, perforated air inlet tubes are inserted into it, air bubbling is started, and then the basin is filled up with an aqueous reagent solution 13 of the same composition as given in Example 2. The level of solution in the basin is kept at a constant value by refilling the solution as required. When the exfiltration of the solution ceases (generally after 2 to 4 hours), the liquid is removed from the basin as described in Example 2. Thus repair is finished. The solution, which penetrates into or through the cracks and other damaged parts, gellifies outside the basin wall, and the resulting gel clogs and gel-containing soil layers 14 render the basin completely water-tight. When basins or tanks are repaired, it is preferred to use space-reducing elements to save reagent solution.

What we claim is:

1. A process for improving the strength and impermeability of particulate materials or solid articles, comprising the steps of:
   (a) stabilizing an aqueous gel-forming system comprising a water-soluble acrylic monomer as gellifying agent, methylenebis-acrylamide co-monomer or a mono- or bivalent aldehyde as cross-linking agent, a redox catalyst system containing an alkali metal or ammonium persulfate as oxidizing component along with an amine compound as reducing component, and optionally a water-soluble polymer for adjusting the viscosity of the solution or modifying the gel structure, by saturating said gel-forming system with molecular oxygen;
   (b) treating the particulate materials or the solid articles with said aqueous gel-forming system; and
   (c) finally suspending oxygen saturation of the gel-forming system after an effective amount of oxygen is introduced in the system.

2. The process of claim 1 for canal repair, wherein the canal to be repaired or a part thereof, bordered by space isolating elements, is filled up with a gel-forming system stabilized by introducing oxygen gas or an oxygen containing gas mixture into said canal or canal part, the gel-forming system is allowed to penetrate into the damaged parts; the excess of the gel-forming system is removed while maintaining gas introduction, and finally gas introduction is stopped.

3. The process of claim 2, wherein a particulate solid material is further introduced into the canal or canal section to be repaired as an aqueous suspension, before, simultaneously with or after introducing the stabilized gel-forming system.

4. The process of claim 2 or 3, wherein a space-reducing element is further inserted into the canal or canal section to be repaired prior to introducing the stabilized gel-forming system.

5. The process of claim 1, wherein the gel-forming system is applied into the article.

6. The process of claim 1, wherein the gel-forming system is applied on the article.

7. The process of claim 1, wherein the gel-forming system is applied into the surroundings of the article.

* * * * *